United States Patent
Ogawa et al.

(10) Patent No.: US 8,643,761 B2
(45) Date of Patent: *Feb. 4, 2014

(54) CAMERA AND CONTROL METHOD OF CAMERA

(75) Inventors: Shigeo Ogawa, Yokohama (JP); Yuichi Nakase, Tokyo (JP); Akira Kubota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

This patent is subject to a terminal disclaimer.

(21) Appl. No.: 13/551,023

(22) Filed: Jul. 17, 2012

(65) Prior Publication Data

US 2012/0281116 A1    Nov. 8, 2012

Related U.S. Application Data

(63) Continuation of application No. 12/544,902, filed on Aug. 20, 2009, now Pat. No. 8,279,321.

(30) Foreign Application Priority Data

Aug. 22, 2008   (JP) ................................. 2008-214227

(51) Int. Cl.
  *H04N 5/222*   (2006.01)

(52) U.S. Cl.
  USPC .................................. 348/333.11; 348/333.12

(58) Field of Classification Search
  USPC ............. 348/333.01, 333.05, 333.11, 333.12, 348/207.99; 386/210, 219
  See application file for complete search history.

(56) References Cited

FOREIGN PATENT DOCUMENTS

JP        2006-180140 A    7/2006
JP        2008-131533 A    6/2008

*Primary Examiner* — Tuan Ho
(74) *Attorney, Agent, or Firm* — Canon USA, Inc. IP Division

(57) ABSTRACT

An apparatus includes an imaging unit to capture an image of an object, a selection unit to select one of a plurality of shooting modes of the imaging unit, a recording unit to record the captured image onto a recording medium, a switching unit to switch between a reproduction mode in which recorded image data is read out and displayed on a display device, and a shooting processing mode in which shooting processing is performed in the selected shooting mode and a reproduction control unit to cause the display device to display the read out image data. When the switching unit switches the mode to the reproduction mode, the reproduction control unit changes an operation that can be instructed in the reproduction mode according to the selected shooting mode.

6 Claims, 9 Drawing Sheets

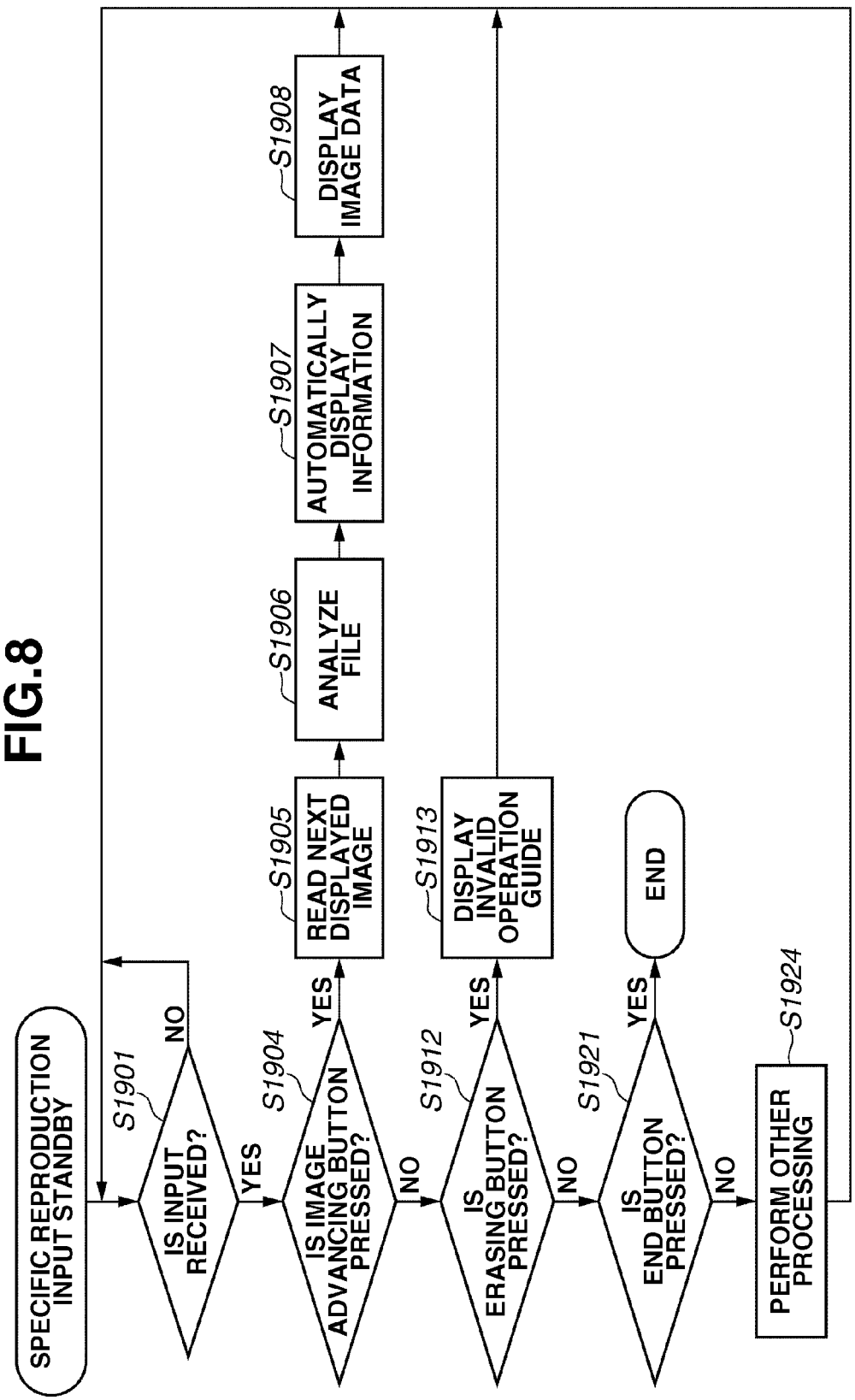

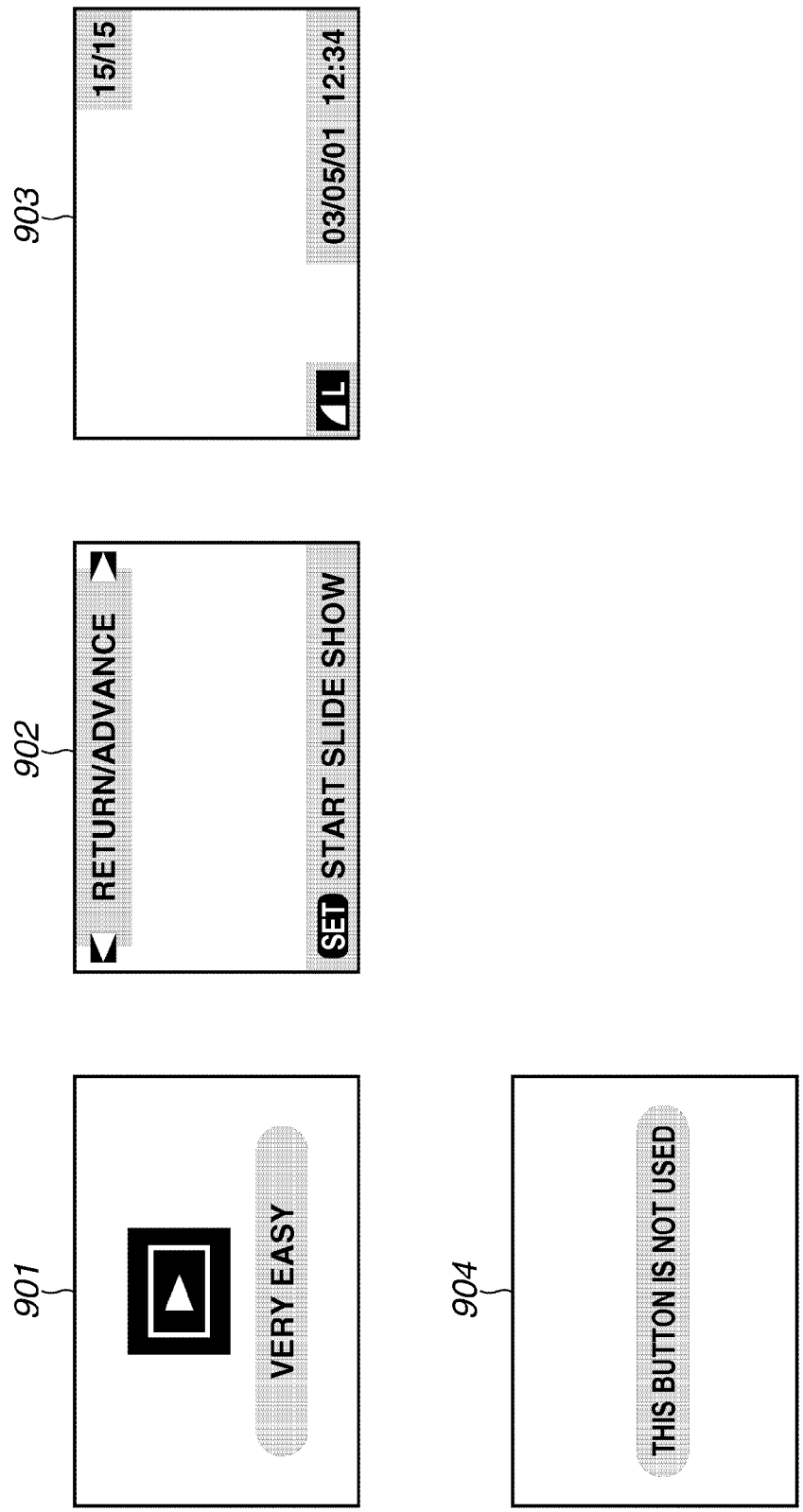

CAMERA AND CONTROL METHOD OF CAMERA

CROSS-REFERENCED TO RELATED APPLICATIONS

This application is a Continuation of U.S. application Ser. No. 12/544,902, filed Aug. 20, 2009, which claims priority from Japanese Patent Application No. 2008-214227 filed Aug. 22, 2008, which are hereby incorporated by reference herein in their entireties.

BACKGROUND OF THE INVENTION

1. Field of the Invention

The present invention relates to a digital camera that allows a user to select different shooting modes, and more particularly, to a reproduction display mode of image data.

2. Description of the Related Art

Conventional digital cameras provided with a plurality of shooting modes are often provided with a simple shooting mode for beginners in which shooting can be easily performed, in addition to a normal shooting mode. In the simple shooting mode, when a user presses only a shutter button, the camera determines and automatically sets shooting conditions appropriate for a scene, and performs shooting. The simple shooting mode is designed so that beginners can easily perform shooting operations with less operational errors and worries.

Further, general digital cameras include a display device such as a liquid crystal display, so that captured images can be checked on the spot.

In a technique discussed in Japanese Patent Application Laid-Open No. 2004-120225, captured images are displayed in a reproduction mode in a digital camera equipped with a shooting mode dial for switching shooting modes. Filter processing of the images which a user wants to display can be performed by displaying the images corresponding to the selected shooting mode which is selected with the shooting mode dial.

In such a conventional camera, however, there may be an issue that while a simple operation mode for shooting is provided, consideration for beginners is not given to the reproduction mode for displaying the captured images.

In a technique discussed in Japanese Patent Application Laid-Open No. 2004-120225, a simple and explicit classification method for displaying captured images is provided by utilizing the shooting mode which has been set during shooting in the reproduction mode.

However, consideration is not sufficiently given to reducing difficulty in the operations which beginners have to understand in the reproduction mode, and decreasing cases where beginners make a mistake in performing processing which is difficult for them, such as image erasure and editing. In other words, the conventional digital cameras have not yet reached a point where beginners can easily operate the camera without worries in the reproduction mode.

SUMMARY OF THE INVENTION

According to an aspect of the present invention, an apparatus includes an imaging unit configured to capture an image of an object, a selection unit configured to select one of a plurality of shooting modes of the imaging unit, a recording unit configured to record the captured image onto a recording medium, a switching unit configured to switch between a reproduction mode in which recorded image data is read out and displayed on a display device and a shooting processing mode in which shooting processing is performed in the selected shooting mode, and a reproduction control unit configured to cause the display device to display the read out image data. When the switching unit switches the mode to the reproduction mode, the reproduction control unit changes an operation that can be instructed in the reproduction mode according to the selected shooting mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a flowchart illustrating standby processing for specific reproduction input in reproduction processing.

FIG. 9 illustrates examples of an operation guide display in a specific reproduction mode.

DETAILED DESCRIPTION OF THE EMBODIMENTS

Various exemplary embodiments, features, and aspects of the invention will be described in detail below with reference to the drawings.

In an exemplary embodiment described below, the present invention is applied to a digital camera, i.e. an imaging apparatus, as an example, that has a simple shooting mode in which images can be captured by a simple operation and a manual shooting mode in which many shooting conditions can be set by a user.

Figure 1:
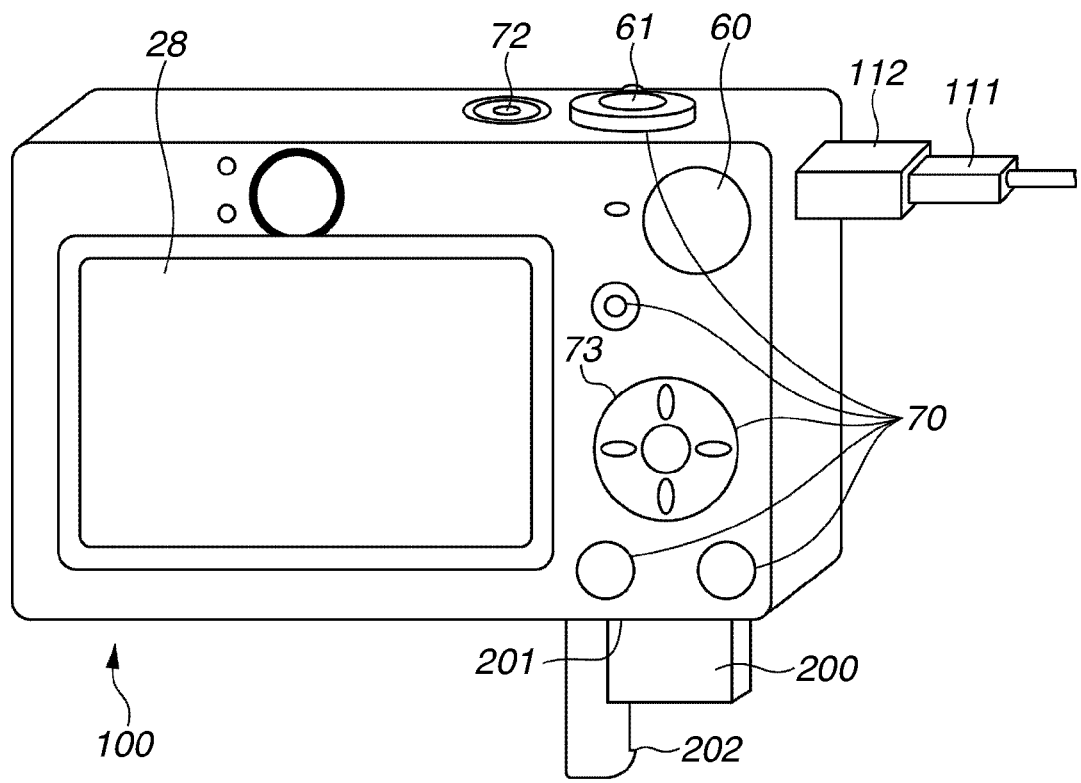
FIG. 1 is an outline view of a digital camera as an example of an imaging apparatus according to an exemplary embodiment.

FIG. 1 is an outline view of a digital camera 100 which can capture an image of an object to acquire image data. In FIG. 1, a display unit 28 displays images and various pieces of information. A power supply switch 72 turns power on and off. The digital camera 100 includes a shutter button 61. Various modes in the digital camera 100 can be switched with a shooting mode changeover switch 60. More specifically, shooting modes can be switched between, for example, the simple shooting mode (full automatic shooting mode) and the manual shooting mode in which many shooting conditions can be set by the user. Although, these shooting modes are described as modes for recording a still image, they may include, other than these modes, a moving image shooting mode and a panoramic shooting mode for obtaining images with a wide viewing angle by combining a plurality of images. A connection cable 111 connects the digital camera 100 and external devices. A connector 112 connects the connection cable 111 and the digital camera 100.

An operation unit 70 accepts various operations from the user. The operation unit 70 has various buttons and operation members such as a touch panel provided on a screen of an image display unit 28 as illustrated in FIG. 1. Various buttons of the operation unit 70 include a reproduction button, an erasing button, a menu button, a SET button, 4-way buttons arranged in a cross shape (top button, bottom button, right button, left button), a wheel 73, and the like. A recording medium 200 includes a memory card, a hard disk, and so forth. A recording medium slot 201 holds the recording medium 200. The recording medium 200 held within the recording medium slot 201 can communicate with the digital camera 100. The recording medium slot 201 has a lid 202.

Figure 2:
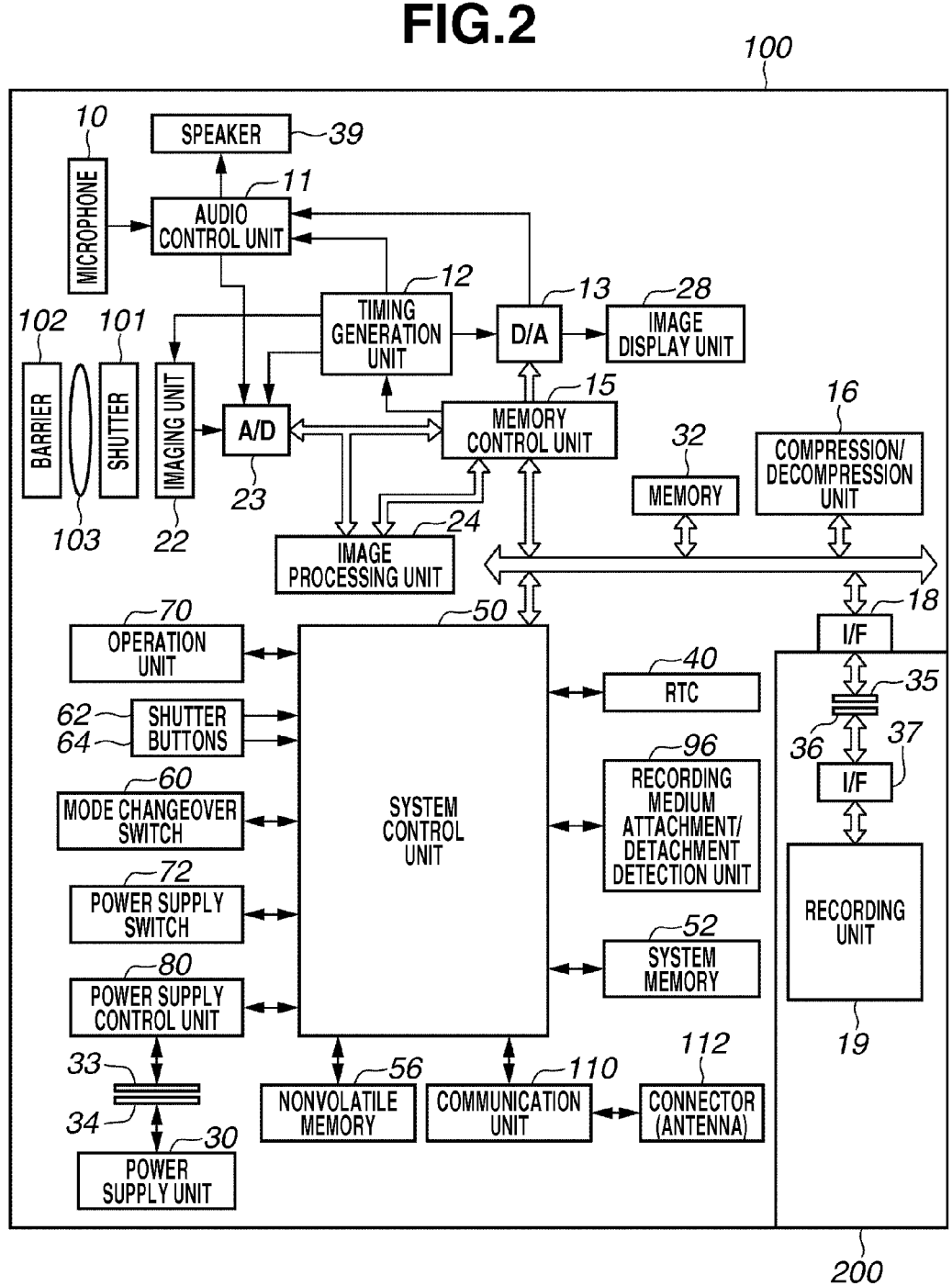
FIG. 2 is a block diagram illustrating a configuration of a digital camera according to an exemplary embodiment.

FIG. 2 is a block diagram illustrating a configuration example of the digital camera 100 according to the present exemplary embodiment. In FIG. 2, the digital camera 100 includes a photographic lens 103, a shutter 101 with an aperture function, and an imaging unit 22 including a charge coupled device (CCD) or a complementary metal oxide semiconductor (CMOS) element which converts an optical image into an electric signal. An analog-to-digital (A/D) converter 23 converts an analog signal into a digital signal. The A/D converter 23 is used when an analog signal output from the imaging unit 22 is converted into a digital signal, and when an analog signal output from an audio control unit 11 is converted into a digital signal. A barrier 102 prevents dirt and damage to an imaging system including the photographic lens 103, the shutter 101, and the imaging unit 22 by covering the imaging unit 22 including the lens 103 of the digital camera 100.

A timing generation unit 12 supplies a clock signal and a control signal to the imaging unit 22, the audio control unit 11, the A/D converter 23, and a digital-to-analog (D/A) converter 13. The timing generation unit 12 is controlled by a memory control unit 15 and a system control unit 50. An image processing unit 24 performs predetermined pixel interpolation, resize processing such as reduction, and color conversion processing on data from the A/D converter 23, or data from the memory control unit 15. Further, in the image processing unit 24, predetermined arithmetic processing is executed using captured image data, and the system control unit 50 performs exposure control and range-finding control based on an obtained arithmetic result. Thus, auto-focus (AF) processing of a through-the-lens (TTL) method, automatic exposure (AE) processing, and electronic flash pre-emission (EF) processing are performed. Further, in the image processing unit 24, predetermined arithmetic processing is performed using the captured image data, and auto-white balance (AWB) processing of the TTL method is performed based on the obtained arithmetic result.

Output data from the A/D converter 23 is written in a memory 32, via the image processing unit 24 and the memory control unit 15, or, directly via the memory control unit 15. Consequently, the image data obtained by capturing the image of the object is recorded on the memory 32.

The memory 32 stores the image data which is obtained by the imaging unit 22 and converted into digital data by the A/D converter 23, and the image data to be displayed on the image display unit 28. In addition, the memory 32 is used for storing audio data recorded by a microphone 10, still images, moving images and file headers for forming image files. Therefore, the memory 32 has a sufficient storage capacity to store a predetermined number of still images, and moving images and audio for a predetermined length of time.

A compression/decompression unit 16 compresses, and decompresses the image data using adaptive discrete cosine transform (ADCT) or the like. The compression/decompression unit 16 reads out the captured image stored in the memory 32 in response to an operation of the shutter 101 to compress the captured image, and writes the compressed data in the memory 32. Further, the compression/decompression unit 16 decompresses the compressed images loaded into the memory 32 from a recording unit 19 of the recording medium 200 or the like, and writes the decompressed data on the memory 32. The image data written on the memory 32 by the compressions/decompression unit 16 is stored as a file in a file unit of the system control unit 50, and recorded on the recording medium 200 via an interface 18. Further, the memory 32 serves as a memory (video memory) for an image display. The D/A converter 13 converts the data for the image display stored in the memory 32 into analog signals and supplies the analog signals to the image display unit 28. The image display unit 28 performs a display corresponding to the analog signals from the A/D converter 23 on a display device such as a liquid crystal display (LCD). In this manner, the image data for display written in the memory 32 is displayed by the image display unit 28 via the D/A converter 13.

An audio signal which is input from the microphone 10 is supplied to the A/D converter 23 via the audio control unit 11 including an amplifier or the like, converted into a digital signal in the A/D converter 23, and subsequently stored in the memory 32 by the memory control unit 15. On the other hand, audio data recorded on the recording medium 200 is loaded into the memory 32, and subsequently converted into an analog signal by the D/A converter 13. The audio control unit 11 drives a speaker 39 by the analog signal to output sounds.

A nonvolatile memory 56 is an electrically erasable/recordable memory, and includes, for instance, electrically erasable programmable read-only memory (EEPROM) and the like. In the nonvolatile memory 56, constants and programs for an operation of the system control unit 50 are stored. The programs herein are programs for executing processing in various flowcharts described below in the present exemplary embodiment.

The system control unit 50 controls the entire digital camera 100. The system control unit 50 implements each processing of the present exemplary embodiment described below by executing the programs recorded on the nonvolatile memory 56 described above. A system memory 52 may use a random-access memory (RAM). In the system memory 52, constants, variables for operations of the system control unit 50, and the programs read out from the nonvolatile memory 56 are developed.

The mode changeover switch 60, a first shutter switch 62, a second shutter switch 64, an operation unit 70 are operation units for inputting various operation instructions to the system control unit 50.

The mode changeover switch 60 can switch an operation mode of the system control unit 50 between the simple shooting mode and other shooting modes, for instance, the manual shooting mode. The first shutter switch 62 is turned on halfway through in an operation (half-press) of the shutter button 61 provided in the digital camera 100 and generates a first shutter switch signal SW1. The system control unit 50 starts operations, such as AF processing, AE processing, AWB processing, and EF processing in response to the first shutter switch signal SW1.

The second shutter switch 64 is turned on upon completion of the operation (full-press) of the shutter button 61, and generates a second shutter switch signal SW2. The system control unit 50 starts operations of a series of shooting processing from reading out a signal from the imaging unit 22 to writing the image data into the recording medium 200, in response to the second shutter switch signal SW2.

Each operation member of the operation unit 70 is assigned an appropriate function depending on a scene by selecting various function icons displayed on the image display unit 28 and variously serves as function buttons. The function buttons include, for instance, an end button, a reproduction button, a return button, an image advancing button, a search button, a defining button, an attribute change button, and a print designation button. For instance, when the menu button is pressed, a menu screen which enables a user to perform various settings is displayed on the image display unit 28. The user can intuitively perform various settings using the menu screen displayed on the image display unit 28, the 4-way button, and the SET button. Further, when the reproduction button is pressed while an operation for shooting or shooting in a shooting processing mode is performed, the process can shift to a reproduction mode for displaying images in the memory.

Further, when the reproduction button is pressed again in the reproduction mode, the process returns to the shooting processing mode, thus a shooting operation can be performed. The power supply switch 72 turns power on and off.

The process can shift to the above-described reproduction mode by pressing the reproduction button when the power supply switch 72 is off.

The above-described reproduction button may be formed by a button physically installed on a digital camera main body. The reproduction button has only to function as a switching unit for switching the mode to the reproduction mode when operated during the shooting processing mode or the power-off status.

The power supply control unit 80 includes a battery detection circuit, a direct current to direct current (DC-DC) converter, a switching circuit for switching blocks to be energized, and the like, and detects presence/absence of attached batteries, types of batteries, and remaining battery capacity. Further, the power supply control unit 80 controls the DC-DC converter based on detection results thereof and instructions of the system control unit 50, and supplies voltage for period of time to units including the recording medium 200.

The power supply unit 30 includes a primary battery, such as an alkali battery and a lithium (Li) battery, a secondary battery, such as a nickel-cadmium (NiCd) battery, a nickel metal hydride (NiMH) battery, and a Li battery, and an alternate current (AC) adapter. The connectors 33 and 34 connect the power supply unit 30 and the power supply control unit 80.

A real time clock (RTC) 40 counts date and time. The RTC 40 internally includes a power supply unit, aside from the power supply control unit 80, and can maintain a time counting status even when the power supply unit 30 is turned off. The system control unit 50 sets a system timer using date and time acquired from the RTC 40 during start-up, and executes timer control.

The recording medium 200 such as a memory card and a hard disk, and the interface 18 are connected to each other by the connector 35. The recording medium attachment and detachment detection unit 96 detects whether the recording medium 200 is attached to the connector 35.

The recording medium 200 is provided with the recording unit 19 including a semiconductor memory and a magnetic disk, an interface 37 with the digital camera 100, and a connector 36 for connecting the recording medium 200 and the digital camera 100.

A communication unit 110 performs various types of communication processing, such as Recommended Standard (RS) 232C, a universal serial bus (USB), Institute of Electrical and Electronics Engineers (IEEE) 1394, P 1284, a small computer system interface (SCSI), a modem, a local area network (LAN), a wireless communication, etc. A connector (an antenna for wireless communication) 112 connects the digital camera 100 with other devices via the communication unit 110.

Figure 3:
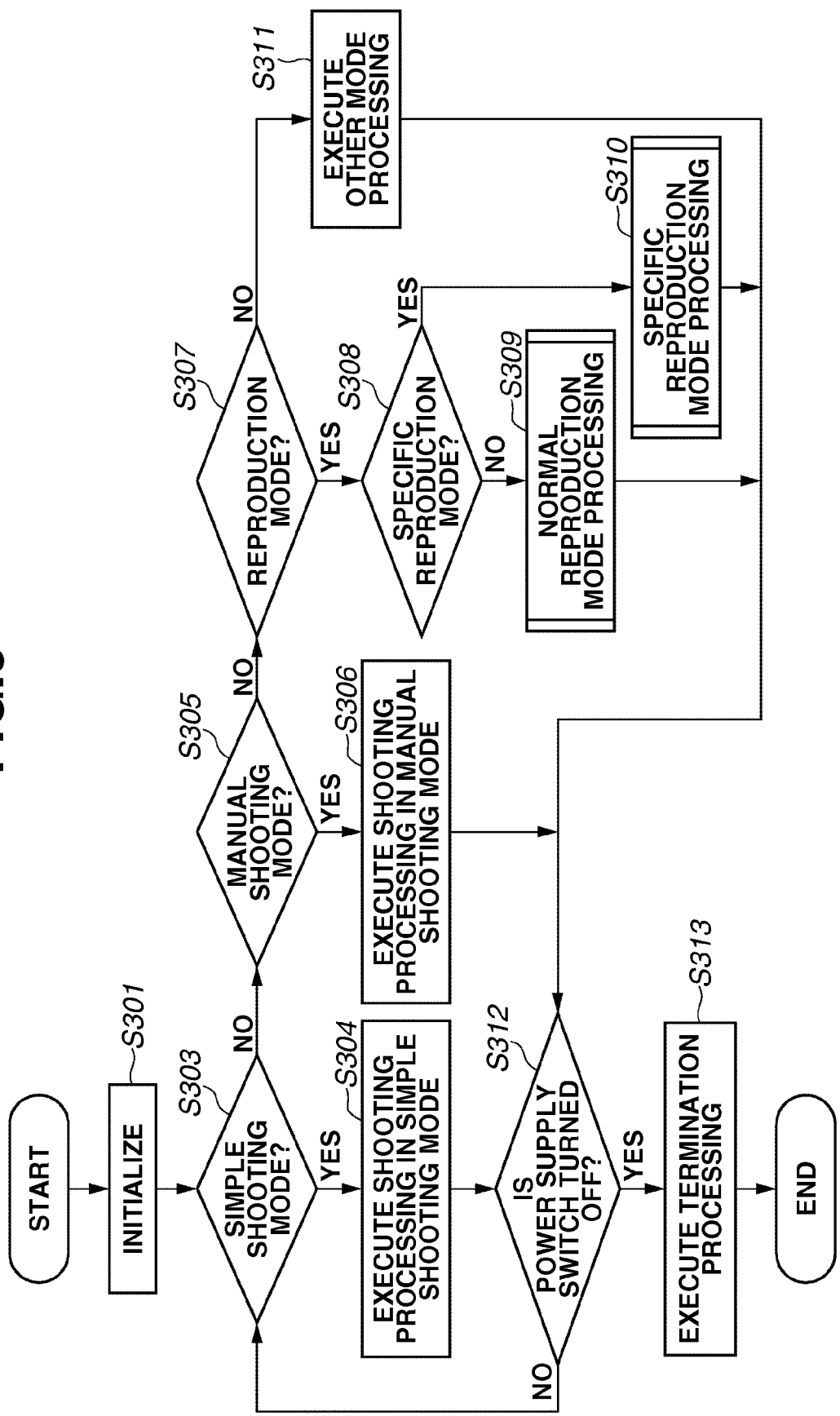
FIG. 3 is a flowchart illustrating an overall operation of a digital camera.

FIG. 3 is a flowchart illustrating an overall operation of the digital camera 100 according to the present exemplary embodiment. A plurality of predetermined reproduction modes corresponding to the selected shooting mode is provided to the digital camera 100.

If the power supply switch 72 is turned on, then in step S301, the system control unit 50 initializes flags, control variables, and the like.

Next, insteps S303 (e.g., is it a simple shoot mode?), S305 (e.g., is it a manual shooting mode?), and S307 (e.g., is it a reproduction mode?), the system control unit 50 determines mode setting positions of the mode changeover switch 60 and the operation unit 70. If the mode changeover switch 60 is set to the simple shooting mode (YES in step S303), and the reproduction mode button of the operation unit 70 is not pressed, the process proceeds from step S303 to step S304 and shooting processing in the simple shooting mode is executed.

If the mode changeover switch 60 is set to a shooting mode other than the simple shooting mode (NO in step S303), and the reproduction mode button of the operation unit 70 is not pressed (YES in step S305), the process proceeds to step S306 and the shooting processing in the set shooting mode is executed (e.g., execute shooting processing in manual shooting mode).

If the reproduction mode button is pressed by the operation unit 70 (YES in step S307), the process proceeds to step S308 via steps S303, S305, and S307.

In step S308, the system control unit 50 determines whether a mode for shifting to the specific reproduction mode is set with reference to the mode setting position of the mode changeover switch 60. In this process, if the mode changeover switch 60 is set to the simple shooting mode, the system control unit 50 determines to shift to the specific reproduction mode (YES in step S308). Then the process proceeds to step S310 and the specific reproduction mode processing is executed. If the mode changeover switch 60 is set to other modes, for instance, the manual shooting mode instead of the simple shooting mode (NO in step S308), the process proceeds to step S309 and the normal reproduction mode processing is executed. The details of the reproduction mode processing of steps S309 and S310 will be described below with reference to FIG. 4 and FIG. 7.

As the other modes above-described, a shutter speed priority shooting mode, and a user shooting mode in which shooting conditions can be freely predetermined by a user is also acceptable.

After executing the processing of steps S304, S306, S309, S310, and S311 corresponding to the modes set by the mode changeover switch 60 and the operation unit 70 by steps S304, S306, S309, S310, and S311 (e.g., execute other mode processing), the process proceeds to step S312. In step S312, the system control unit 50 determines a setting position of the power supply switch 72. If the power supply switch 72 is set to power-on (NO in step S312), the process returns to step S303. On the other hand, if the power supply switch 72 is set to power-off (YES in step S312), the process proceeds to step S313, and the system control unit 50 performs termination processing.

The termination processing includes following processing, for instance, changing a display of the image display unit 28 to a termination status, closing the barrier 102 to protect the imaging unit 22, recording parameters, set values, and set modes including flags and control variables on the nonvolatile memory 56, and interrupting power to portions where power supplies are not consumed. Upon completion of the termination processing of step S313, the processing of the flowchart in FIG. 3 is terminated, and the process shifts to power-off status.

Instructions which can be given to the above-described specific reproduction mode and the normal reproduction mode are different with respect to at least any one of availability of image erasure, availability of an enlarged image display, availability of an image multi-display, availability of image editing, availability of a display of attribute information relating to the images, or availability of a menu display.

Regarding, for instance, an image erasing operation, an enlargement display operation, a multi-display operation, and image edit operations such as a color change, rotation, and resizing, any of the above-described operations are executable in the normal reproduction mode. However, all or some of these operations are inexecutable in the specific reproduction mode. Further, regarding a display instruction of the attribute information such as dates and shooting conditions, and the display instruction of the menu, any of the above-described operations are executable in the normal reproduction mode. However, all or some of these operations are inexecutable in the specific reproduction mode.

If executable operations and inexecutable operations are set differently between the normal reproduction mode and the specific reproduction mode, it is included within the scope of the present invention. It is useful to differentiate a number of executable operations in each mode to provide operational environments friendly to beginners and those friendly to experts. In particular, it may be suitable to provide more executable operations in the reproduction mode for experts than in the reproduction mode for beginners. In the present exemplary embodiment, it may be to provide more executable operations in the normal reproduction mode than in the specific reproduction mode.

Figure 4:
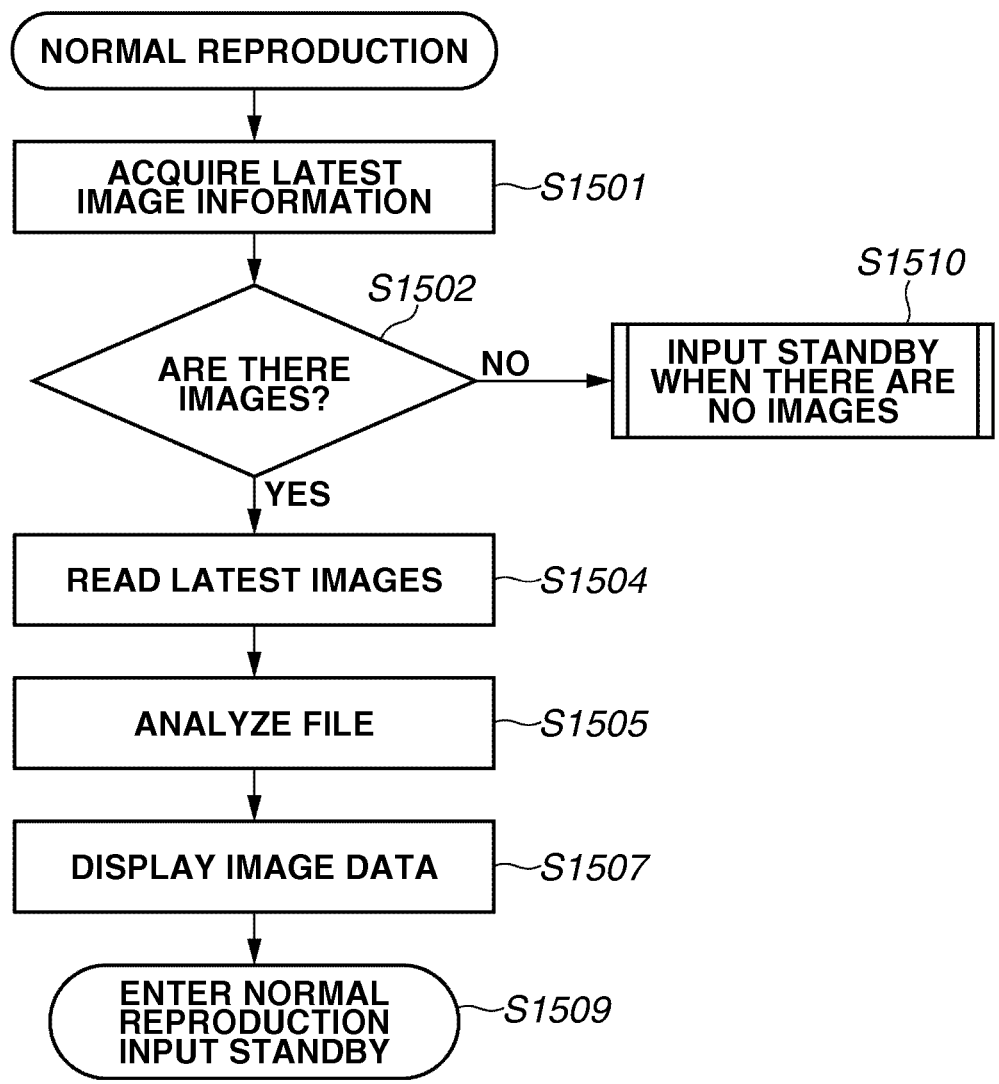
FIG. 4 is a flowchart illustrating normal reproduction processing of a digital camera.

Details of step S309 of the above described overall operational flow (FIG. 3) will be described with reference to FIG. 4. FIG. 4 is a flowchart illustrating contents of reproduction control in the normal reproduction mode of the digital camera 100 according to the present exemplary embodiment.

In step S1501, the system control unit 50 acquires latest image information from the recording medium 200. In step S1502, the system control unit 50 checks whether the latest image information in step S1501 has been properly acquired.

If the latest image information cannot be acquired (NO in step S1502), the process proceeds to step S1510. In step S1510, the system control unit 50 enters into an input standby status when there are no images. The processing of step S1510 will be described below using the flowchart of FIG. 5. If the latest image information may not be acquired, it is conceivable that there is no image in the recording medium 200, or the image information cannot be acquired due to defect in the recording medium 200. If the latest image information can be acquired (YES in step S1502), it is determined that at least one image frame is present, and then the process proceeds to step S1504.

In step S1504, the system control unit 50 reads out the latest image data from the recording medium 200 based on the latest image information acquired in step S1501. Then in step S1505, the system control 50 analyzes a file and acquires shooting information and attribute information about images in the read image data.

In step S1507, the system control unit 50 displays the latest image data which has been read out. At this time, the system control unit 50 displays also the shooting information and the attribute information acquired in step S1505. Further, if it is found out that the image data is defective, such that a part of the file is broken, by a file analysis result of step S1505, an error display is performed at the same time.

In step S1509, the system control unit 50 enters into the input standby status. The processing in the input standby status will be described below using the flowchart of FIG. 6.

Figure 5:
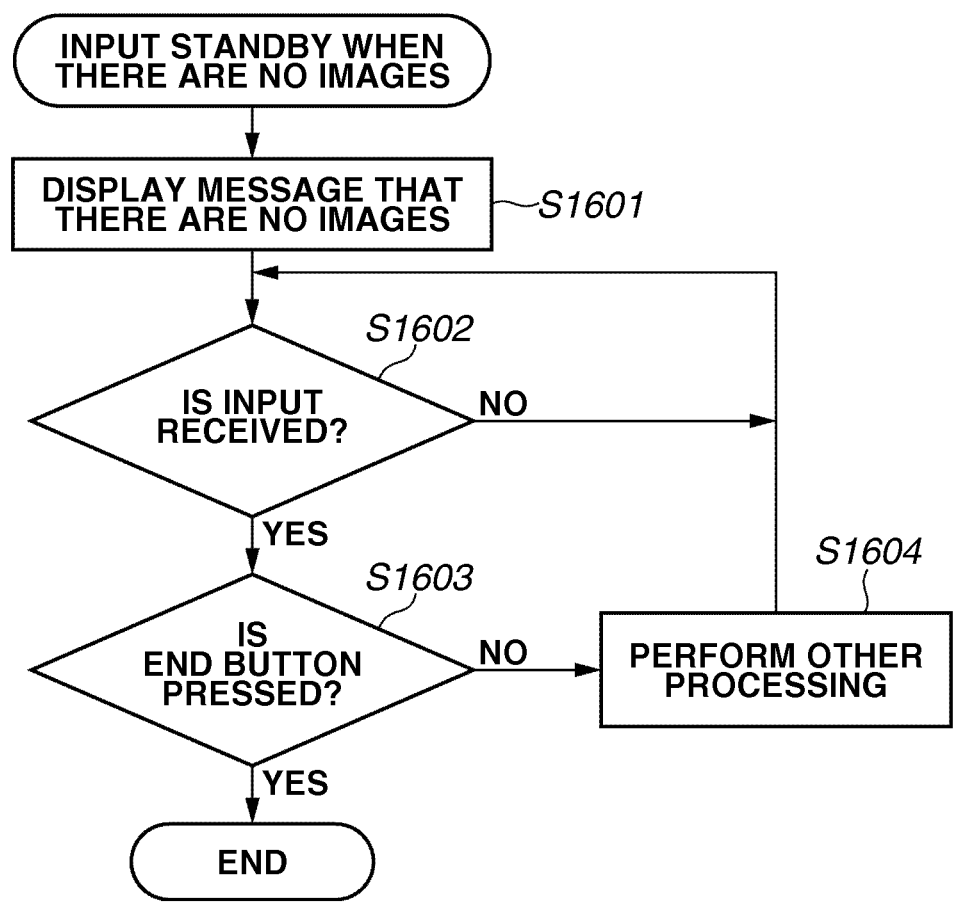
FIG. 5 is a flowchart illustrating processing when there are no images in reproduction processing.

FIG. 5 is the flowchart illustrating processing in the input standby status when there are no images in the reproduction mode.

In step S1601, the system control unit 50 causes the image display unit 28 to display a message "there are no images" to notify a user that there is no image data.

In step S1602, the system control unit 50 waits for an input. The input includes operations on buttons and the battery lid by the user, an event that notifies a power drop, and the like.

If any input is received (YES in step S1602), the process proceeds to step S1603 and the system control unit 50 checks whether the input is an operation of the end button. If it is determined that the end button is operated (YES in step S1603), the reproduction mode processing is terminated, then the process proceeds to step S312 of FIG. 3.

On the other hand, if the input is an operation of a button other than the end button (NO in step S1603), the process proceeds to S1604 and the processing corresponding to the input is performed. For instance, when an operation of the menu button is input even if there is no image data, the menu screen is displayed on the image display unit 28, and allows the user to change a setting or the like. However, the operation using the menu button is invalid in the specific reproduction mode in step S310 of FIG. 3, and valid in the normal reproduction mode in step S309.

Figure 6:
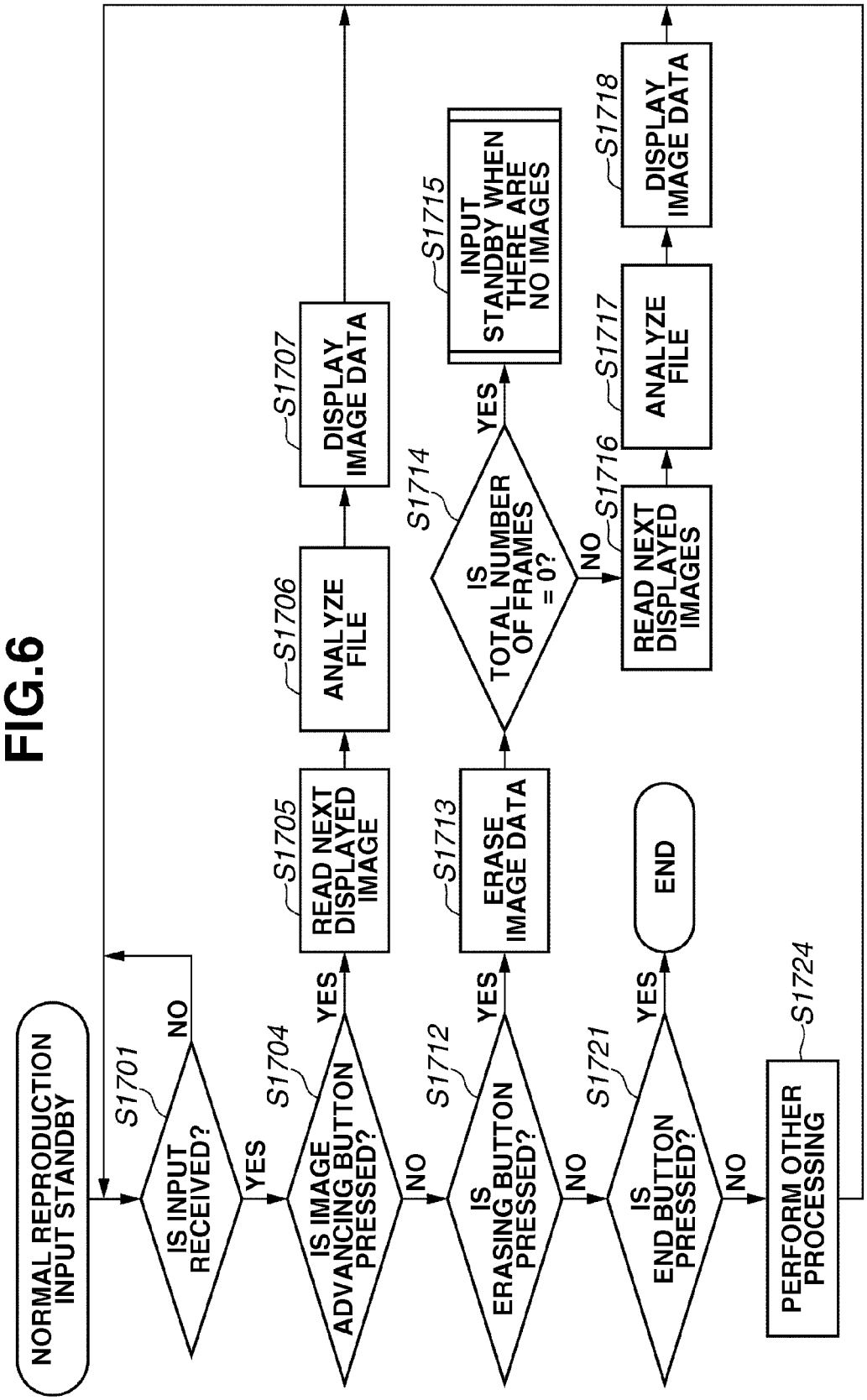
FIG. 6 is a flowchart illustrating standby processing for normal reproduction input in reproduction processing.

FIG. 6 is a flowchart illustrating processing of the input standby status in the normal reproduction mode. In step S1701, the system control unit 50 checks whether an input by a user is received. The input includes operations on buttons and the battery lid by the user, an event that notifies the power drop, and the like. If no input is received (NO in step S1701), the process waits for an input. If any input is received (YES in step S1701), the process proceeds to step S1704.

In step S1704, the system control unit 50 determines whether the input is an operation of the image advancing button included in the operation unit 70. If the input is the operation of the image advancing button (YES in step S1704), the process proceeds to step S1705, and the system control unit 50 reads out next display image. The image advancing button is formed by a pair of buttons corresponding to advancing directions, and the next display image will be read out according to the advancing direction corresponding to an operated button.

Next, in step S1706, the system control unit 50 analyzes a file of the image data read out in step S1705, and acquires shooting information and attribute information of images in the latest image data which has been read out. Then, in step S1707, the system control unit 50 displays the image data read out in step S1705. At this time, the system control unit 50 displays the shooting information and the attribute information using a file analysis result of step S1706. Further, if it is determined that the image data is defective, such that apart of the file is broken by the file analysis result of step S1706, the error display is performed at the same time. If the display is completed, the process returns to the input standby status of step S1701.

In step S1704, if it is determined that the input is not the operation of the image advancing button (NO in step S1704), the process proceeds to step S1712.

In step S1712, the system control unit 50 checks whether the input is an operation of the erasing button included in the operation unit 70. If the input is the operation of the erasing button (YES in step 1712), the process proceeds to step S1713.

In step S1713, the system control unit 50 erases the image data currently displayed on the image display unit 28. When the erasure of the image data is completed, in step S1714, the system control unit 50 checks a total number of frames after the erasure. If the total number of frames is equal to 0 (YES in step S1714), the process proceeds to step S1715. In step S715, the process shifts to the input standby status when there are no images as described above with reference to FIG. 5.

On the other hand, if the image data remain after the erasure (NO in step S1714), the process proceeds to step S1716, and the system control unit 50 reads out the image data of a next display target to display the next image data. The image data of the display target is image data having a next file number of the erased image data. If the latest image data is erased, the image data having a preceding file number of the erased image data is a display target.

In step S1717, the system control unit 50 analyzes a file of the image data read out as the display target in step S1716, and acquires the shooting information and the attribute information. Then, in step S1718, the system control unit 50 displays the image data read out in step S1716 on the image display unit 28. At this time, the system control unit 50 displays the shooting information and the attribute information acquired in step S1717. Further, if it is determined that the image data is defective, such that a part of the file is broken, by the file analysis result of step S1717, the error display is performed. Upon completion of the display, the process returns to the operation input standby status of step S1701.

In step S1712, if the input is not the operation of the erasing button (NO in step S1712), the process proceeds to step S1721.

In step S1721, the system control unit 50 determines whether the input is an operation of the end button. If the input is the operation of the end button (YES in step S1721), the reproduction mode processing is terminated, then the process proceeds to step S312 of FIG. 3.

In step S1721, if the input is not the operation of the end button (NO in step S1721), the process proceeds to S1724.

In step S1724, the system control unit 50 performs processing corresponding to the input other than the above-described ones. For instance, image editing processing, switching to multi-reproduction, a menu display by the menu button may be performed. The multi-reproduction is a reproduction mode to display a plurality of frames of the reduced image data on one screen of the image display unit 28.

Figure 7:
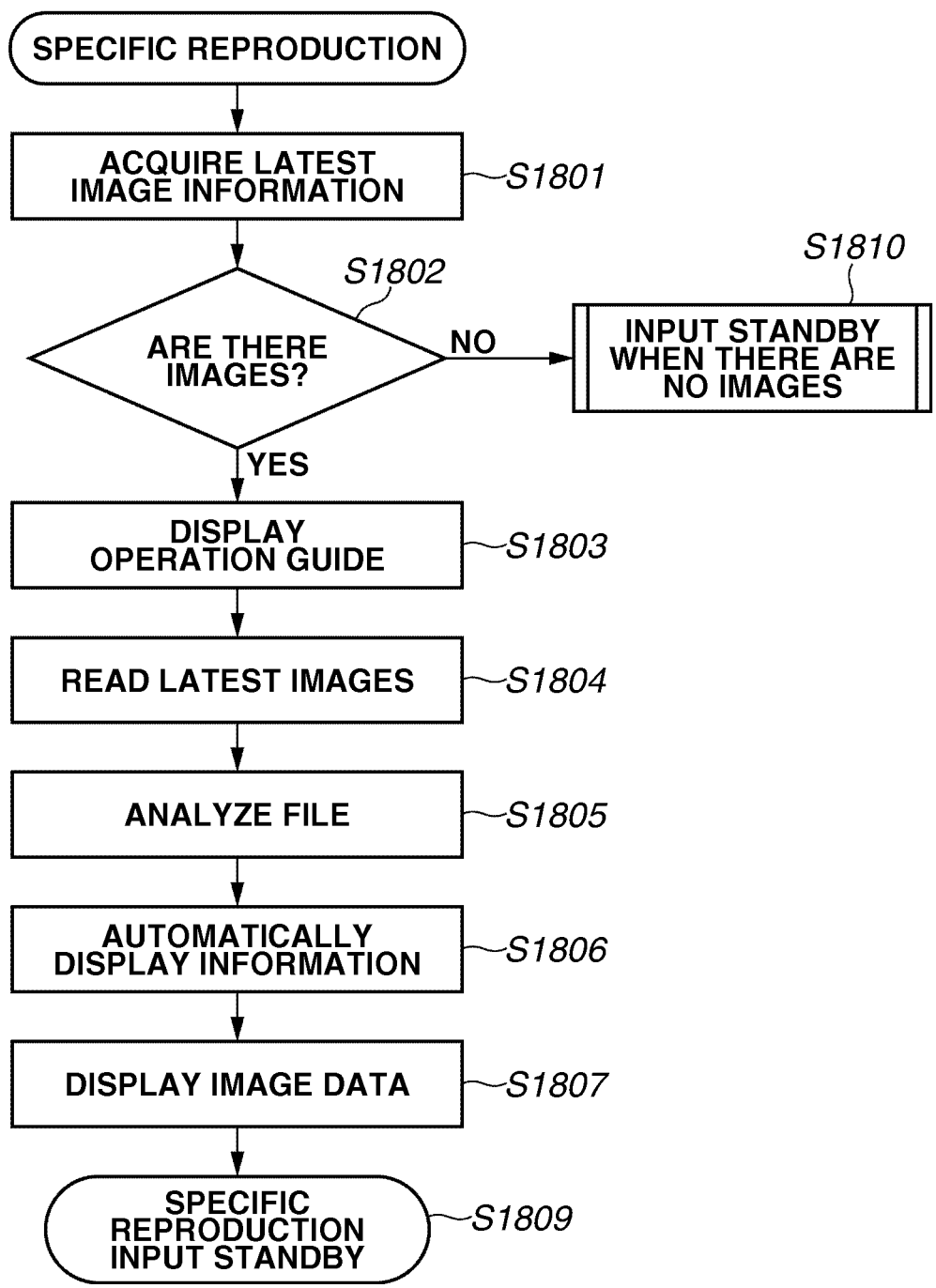
FIG. 7 is a flowchart illustrating specific reproduction processing of a digital camera.

The details of step S310 of the above described overall operational flow (FIG. 3) will be described with reference to FIG. 7. FIG. 7 is a flowchart illustrating an operation of the specific reproduction mode of the digital camera 100 according to the present exemplary embodiment.

In step S1801, the system control unit 50 acquires the latest image information from the recording medium 200. In step S1802, the system control unit 50 checks whether the latest image information in step S1801 is properly acquired.

If the latest image information cannot be acquired (NO in step S1802), the process proceeds to step S1810. In step S1810, the system control unit 50 enters into the input standby status when there are no images. The processing of step S1810 will be described below using the flowchart of FIG. 5. If the latest image information may not be acquired, it is conceivable that there is no image frame in the recording medium 200, or the image information cannot be acquired due to defect in the recording medium 200.

If the latest image information can be acquired (YES in step S1802), it is determined that at least one image frame is present, then the process proceeds to step S1803.

In step S1803, the system control unit 50 displays an operation guide on the image display unit 28. The system control unit 50 displays screens 901 and 902 of FIG. 9, and displays a guide to button operations and functions on the image display unit 28. Further, the button operations and functions may be explained by audio guide via the speaker 39.

In step S1804, the system control unit 50 reads out the latest image data from the recording medium 200 based on the latest image information acquired in step S1801. Then in step S1805, the system control 50 analyzes a file and acquires the shooting information and the attribute information about images in the read image data.

In step S1806, the system control unit 50 displays the shooting information and the attribute information acquired in step S1505. As illustrated in a screen 903 of FIG. 9, the system control unit 50 performs a simple information display regarding information incidental to a captured image. The system control unit 50 may not display information for beginners, or may display information for beginners for a fixed period of time. In the simple information display, the display is erased after the fixed period of time, and turns to a reproduction display of only images. Further, if it is determined that the image data is defective, such that apart of the file is broken, by the file analysis result of step S1805, the error display is performed at the same time.

In step S1807, the system control unit 50 displays the latest image data which has been read out.

In step S1809, the system control unit 50 enters into the input standby status. The processing in the input standby status will be described below using the flowchart of FIG. 8.

FIG. 8 is a flowchart illustrating processing of the input standby status in the specific reproduction mode. In step S1901, the system control unit 50 checks whether an input by a user is received. The input includes operations of buttons and the battery lid by the user, event that notifies a power drop, and the like. If no input is received (NO in step S1901), the process waits until the input is received. If any operation input is received (YES in step S1901), the process proceeds to S1904.

In step S1904, the system control unit 50 determines whether the input is an operation of the image advancing button included in the operation unit 70.

If the input is the operation of the image advancing button (YES in step S1904), the process proceeds to S1905, and the system control unit 50 reads out a next display image. The image advancing button is formed by a pair of buttons corresponding to the advancing directions, and the next display image will be read out according to the advancing direction corresponding to the operated button.

Next, in step S1906, the system control unit 50 analyzes a file of the image data read out in step S1905, and acquires the shooting information and the attribute information of images in the latest image data which has been read out.

Then in step S1907, the system control unit 50 displays the shooting information and the attribute information acquired in step S1906. As illustrated in the screen 903 of FIG. 9, the system control unit 50 performs the simple information display regarding the information accompanying the captured image. The system control unit 50 may not display information for beginners, or may display information for beginners for a fixed period of time. In the simple information display, the display is erased after the fixed period of time, and turns to the reproduction display of only images. Further, if it is determined that the image data is defective, such that a part of the file is broken, by the file analysis result of step S1906, the error display is performed at the same time.

Then, in step S1908, the system control unit 50 displays the image data read out in step S1905. Upon completion of the display, the process returns to the input standby status of step S1901.

In step S1904, if it is determined that the input is not the operation of the image advancing button (NO in step S1904), the process proceeds to step S1912.

In step S1912, the system control unit 50 checks whether the input is the operation of the erasing button included in the operation unit 70.

If the input is determined as the operation of the erasing button (YES instep S1912), the process proceeds to step S1913. In step S1913, the system control unit 50 displays a guide as illustrated in a screen 904 of FIG. 9. Since the operation of the erasing button in the operation unit 70 is prohibited in the specific reproduction mode, a guide informing that use is prohibited, is displayed. Upon completion of the display, the process returns to the operation input standby status of step S1901.

In step S1912, if the input is not the operation of the erasing button (NO in step S1912), the process proceeds to step S1921. In step S1921, the system control unit 50 determines whether the input is the operation of the end button. If the input is the operation of the end button (YES in step 1921), the system control unit 50 terminates the reproduction mode, then the process proceeds to step S312 of FIG. 3.

In step S1921, if the input is not the operation of the end button (NO in step S1921), the process proceeds to step S1924.

In step S1924, the system control unit 50 performs processing corresponding to the input other than the above-described ones. In the normal reproduction mode, the image editing, switching to the multi-reproduction, and the menu display by the menu button may be performed. However, since these functions are prohibited in the specific reproduction mode, these inputs are invalid. Instead, in the specific reproduction mode, a function assigned to the SET button of the operation unit 70 is differentiated from that of the normal reproduction mode. Further, an automatic reproduction is started by pressing the SET button, and the automatic reproduction is stopped by further pressing the SET button.

FIG. 9 illustrates examples of guide which are displayed on the image display unit 28 in steps S1803 and S1806 of FIG. 7 and in steps S1907 and S1913 of FIG. 9.

In the above-described exemplary embodiment, the specific reproduction mode which includes and indicates fewer and limited operations is performed in the simple shooting mode. Further, the normal reproduction mode which includes many operations and enables reproduction for experts, is performed in the manual shooting mode. However, the present invention is not limited to corresponding relationship between illustrated shooting mode and the reproduction mode.

For instance, the simple shooting mode and the manual shooting mode of the above-described exemplary embodiment may be respectively replaced with a still image shooting mode and a moving image recording mode.

Further, a reproduction mode suitable for an instruction operation for the still image reproduction may be associated with the still image recording mode, and a reproduction mode suitable for an instruction operation for the moving image reproduction may be associated with the moving image recording mode.

Hereinbefore, the processing for adding operational restrictions to the reproduction mode, and adding different functions, when the process shifts to the reproduction mode when a specific shooting mode is selected, has been described.

Thus, according to the exemplary embodiment of the present invention, the reproduction modes suitable for experts and beginners of camera operations can be provided respectively. In addition, both the shooting mode and the reproduction mode can be set for beginners by setting a shooting mode dial to a mode for beginners. Accordingly, beginners can easily operate the camera without worries.

In the present exemplary embodiment, the erasing button is prohibited to operate in the specific reproduction mode. However, the exemplary embodiment is not limited to the above setting and the erasing button may be validated. Further, buttons valid in the specific reproduction mode can be set in the normal reproduction mode, and it is not limited to a prohibit operation of the erasing button.

Further, a user may arbitrarily set processing which is operable in the specific reproduction mode in the normal reproduction mode. Accordingly, a degree of freedom of an operation which is executable in the specific reproduction mode can be raised, so that settings can be flexibly adjusted to a level of a user. In other words, an operational environment can be provided which is tailored to a level and a preference of each user, such as a beginner-level user who is a little accustomed to operations, and an intermediate-level user who is accustomed to operations to some degree.

In the above-described description, two types of the reproduction modes are described, but three or more types of the reproduction modes may be provided which correspond to the shooting modes.

The exemplary embodiment of the present invention is described using a digital camera as example, but application of the present invention is not limited thereto. The present invention is applicable to a device capable of shooting and reproducing an image, such as a mobile phone and a portable terminal.

A case where a program of software for implementing functions of the exemplary embodiment described above is supplied from a recording medium directly or using wired/wireless communication to a system or an apparatus which has a computer capable of executing the program, to be executed by the computer is also included in the present invention.

Therefore, a program code itself to be supplied and installed to a computer for implementing functional processes of the present invention by the computer also realizes the present invention. In other words, the computer program itself for implementing the functional processes of the present invention is included in the present invention.

In this case, the program may be in any form, such as an object code, a program executed by an interpreter, and script data to be supplied to an operating system (OS), as long as it has functions of the program.

As a recording medium for supplying the program, a magnetic recording medium, such as a floppy disk, a hard disk and a magnetic tape, a magneto-optical disk (MO), a compact disc read-only memory (CD-ROM), a CD recordable (CD-R), a CD rewritable (CD-RW), a digital versatile disk (DVD-ROM, DVD-R, and DVD-RW), an optical/magneto-optical recording medium, and a nonvolatile semiconductor memory may be used.

As a method for supplying the program using wired/wireless communication, the following method may be used. More specifically, a computer program itself which realizes the present invention, or a program data file is stored in a server on a computer network and downloaded on a client computer which is connected to the server.

Program data file may include a file which includes a compressed computer program for implementing the present invention and an automatic install function.

In this case, the program data file may be divided into a plurality of segment files, and the segment files can be stored in different servers.

In other words, a server device which allows a plurality of users to download the program data file for implementing functional processes of the present invention by a computer is also included in the present invention.

Further, as a method for supplying the program for implementing functions of the exemplary embodiment described above, the program may be encrypted and stored in the recording medium, and distributed to users. A user who satisfies a predetermined condition is allowed to download key information for decryption via a network. The user can execute the encrypted program and install the program in a computer by using the key information to implement the present invention.

The functions of the exemplary embodiment described above are implemented by the computer executing a supplied program code. Further, the functions of the exemplary embodiment described above may be implemented by executing the program code in cooperation with an operating system (OS) which is operating on the computer and other application software. In such a case, such program code is also included in the exemplary embodiment of the present invention.

Further, the supplied program code may be stored in a function expansion board of a computer or a memory provided in a function expansion unit connected to the computer. In such a case, such program code is also included in the present invention. In addition, a central processing unit (CPU) provided in the function expansion board and the function expansion unit performs a part of or all of actual processing based on instructions of the program code, and functions of the exemplary embodiment described above may be implemented by the processing. In such a case, such program code is also included in the present invention.

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus comprising:
   an imaging unit configured to capture an image of an object;
   a recording unit configured to record the captured image onto a recording medium;
   a switching unit configured to switch between a reproduction mode in which recorded image data is read out and displayed on a display device, and a shooting processing mode in which shooting processing is performed by the imaging unit;
   a selection unit configured to select a first shooting mode or a second shooting mode, the first shooting mode or the second shooting mode being performed in the shooting processing mode; and
   a reproduction control unit configured to cause the display device to display the image data read out from the recording medium, when the switching unit switched the mode into the reproduction mode,
   wherein when the switching unit switches the mode to the reproduction mode and in a case where the second shooting mode was selected just before the switching, operations that can be instructed by a user is more limited compared to a case where the first shooting mode was selected just before the switching.

2. The apparatus according to claim 1, wherein in a case where the second shooting mode is selected just before switching the mode into the reproduction mode, at least one of operations of instructing image erasure, display of enlarged image, image multi-display, image editing, display of attribute information relating to the images, a menu display, which were able to be instructed by a user when the first shooting mode is selected by the selection unit just before switching the mode into the reproduction mode, are limited.

3. The apparatus according to claim 1, wherein the number of shooting conditions which can be set in the second shooting mode is less than those in the first shooting mode.

4. A method comprising:
   capturing an image of an object;
   recording the captured image onto a recording medium;
   switching between a reproduction mode in which recorded image data is read out and displayed on a display device, and a shooting processing mode in which shooting processing is performed;
   selecting a first shooting mode or a second shooting mode, the first shooting mode or the second shooting mode being performed in the shooting processing mode; and
   displaying the image data read out from the recording medium, when the switching switched the mode into the reproduction mode,
   wherein when the switching switches the mode to the reproduction mode and in a case where the second shooting mode was selected just before the switching, operations that can be instructed by a user is more limited compared to a case where the first shooting mode was selected just before the switching.

5. The method according to claim 4, wherein in a case where the second shooting mode is selected just before switching the mode into the reproduction mode, at least one of operations of instructing image erasure, display of enlarged image, image multi-display, image editing, display of attribute information relating to the images, a menu display, which were able to be instructed by a user when the first shooting mode is selected just before switching the mode into the reproduction mode, are limited.

6. The method according to claim 4, wherein the number of shooting conditions which can be set in the second shooting mode is less than those in the first shooting mode.

* * * * *